July 8, 1958 — C. R. BOWLAND — 2,842,176
FOOD GRINDER
Filed Nov. 28, 1955
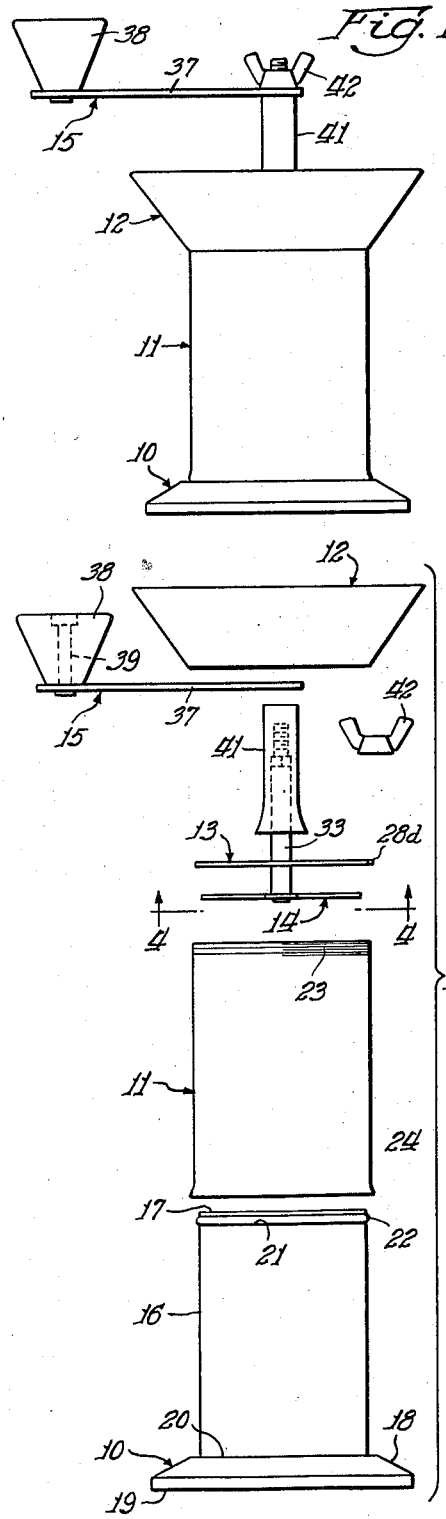
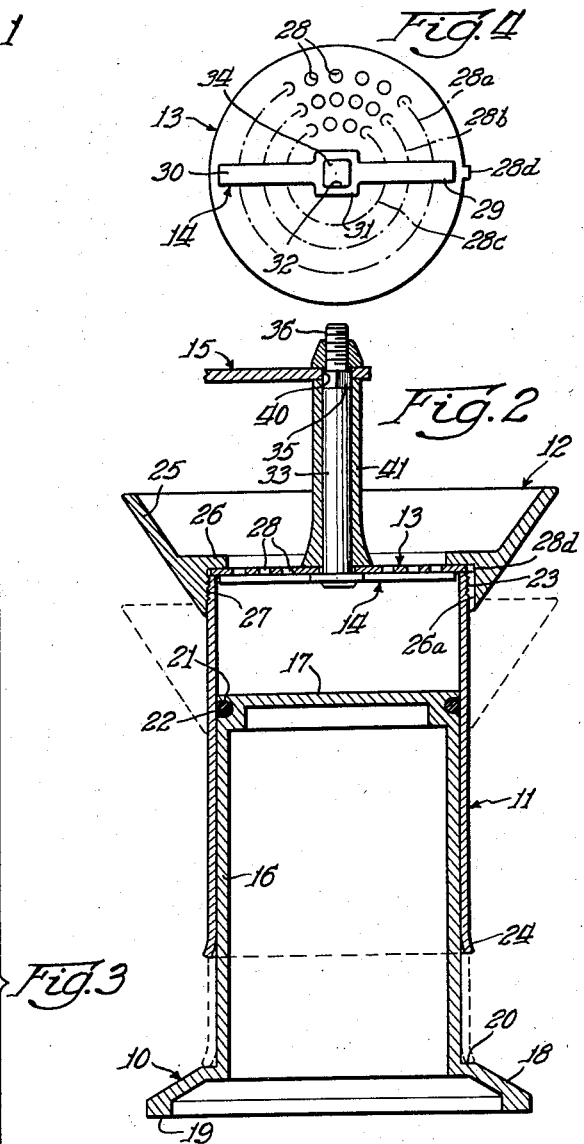
Inventor:
Charles R. Bowland
By:
Keith J. Blener Atty.

United States Patent Office 2,842,176
Patented July 8, 1958

2,842,176

FOOD GRINDER

Charles R. Bowland, Spring Valley, Ill.

Application November 28, 1955, Serial No. 549,265

2 Claims. (Cl. 146—192)

My invention relates to food grinders and more particularly to such grinders especially adapted for food for babies.

It is an object of the invention to provide an improved food grinder in which the food passes vertically and upwardly through the grinder as the food is ground and which is provided on its top with a receptacle portion or cup receiving the ground food processed by the grinder. It is contemplated that the food may be served, as to a baby, directly from the cup, so that it is not necessary to transfer the ground food from the grinder to any other receptacle or dish.

It is another object to provide an improved food grinder having an perforated grinding plate and a knife rotatable thereon with the construction being such that the unprocessed food may be pushed by manual effort through the plate and knife.

More particularly it is an object to mount the perforated plate and knife on a hollow cylindrical shell and to provide a piston slidable in the shell by means of which the food may be pushed through the perforated plate and knife as the knife is rotated. It is contemplated that the piston may be formed on its bottom so that it may be set firmly on a flat surface, such as a table, and manual effort may be used on the shell, pushing it downwardly, so that the piston forces the food through the perforated plate and knife, as the knife is rotated.

It is a further object to provide a handle mounted above the grinder for turning the knife and by means of which additional force may be applied so that the piston forces the food through the perforated plate. In a preferred form of the invention, the knife is mounted on a shaft that extends through the perforated plate, and the handle is mounted on the upper end of the shaft, the shaft being of sufficient length so that the handle clears the edges of a serving cup provided on the top as hereinbefore mentioned. A tubular gland may be provided about the shaft for holding the knife in frictional grinding contact with the perforated plate and for holding the plate and handle in spaced relation.

The invention consists of the novel constructions, arrangements and devices to be hereinafter described and claimed for carrying out the above stated objects and such other objects as will appear from the following description of a preferred form of the invention illustrated with reference to the accompanying drawing, in which:

Fig. 1 is a side elevational view of a food grinder embodying the principles of the invention;

Fig. 2 is a longitudinal sectional view of the food grinder taken on an enlarged scale;

Fig. 3 is an exploded view of the grinder showing the various parts of the grinder; and Fig. 4 is a view of the perforated plate and grinding knife of the grinder.

Like characters of reference designate like parts in the several views.

Referring now to the drawing, the illustrated food grinder may be seen to comprise, in general, a base 10 in the form of a piston; a hollow shell 11 receiving the piston-like base 10, a food serving cup 12 on the top of the shell 11, a perforated plate 13 through which the food is pushed by the piston-like base 10, a knife 14 rotated in frictional contact with the lower face of the plate 13 and a handle 15 for driving the knife.

The base 10 comprises an elongated cylindrical piston portion 16 with a flat top face 17 and a bottom pedestal portion 18 flaring outwardly to increased diameter. The pedestal portion 18 is provided with a flat annular bottom surface 19 so that the base 10 may set flat on a flat surface, such as a table top, and is provided with an annular flat upwardly facing surface 20. The base 10 is provided with an annular groove 21 just below the top face 17, and a sealing ring 22 of rubber-like material is disposed in the groove 21. The ring 22 is round in cross section and fits somewhat loosely in the groove 21 so that, when the base 10 is free of the shell 11, the ring may be stretched while in the groove 21 to provide a part thereof that is outside the groove and may be manually gripped for completely withdrawing the ring out of the groove. This stretching of the ring 22 may be accomplished by extending the thumb and index finger around the piston portion 16 and ring 22 to enclose and grip the ring 22, simultaneously applying pressure by the ends of the thumb and finger on the ring 22 tending to stretch it circumferentially in the groove 21. It is important that the ring 22 may be removed easily for cleaning purposes, as will be hereinafter mentioned in greater detail.

The shell 11 is a simple cylinder threaded at 23 at its top and flared at 24 at its bottom. The flaring 24 expedites the insertion of the base 10 into the shell 11, as will be apparent.

The cup 12 comprises an outwardly flared portion 25, an annular inwardly extending flange 26 and a threaded portion 27 that is screwed on to the threaded portion 23 of the shell 11 so as to hold the cup 12 fixed on the top of the shell 11.

The plate 13 is disposed between the flange 26 and the top edge of the shell 11 and may be securely fixed in this position by firmly screwing the cup 12 and shell 11 together. The plate 13 is provided with a plurality of perforations 28 therethrough. In the particular plate 13 shown, the perforations are in three concentric circles 28a, 28b and 28c. The plate may be of any suitably hard material, such as hardened steel, so that the edges of the holes 28 form permanent sharp cutting edges. The plate 28 and cup 12 are preferably keyed together to prevent relative movement between them, the plate 28 having a tang 28d fitting in an internal slot 26a in the cup 12.

The knife 14 comprises two blades 29 and 30 and a hub 31 and is in firm frictional contact with the lower face of the plate 13. The knife may be formed of uniform thickness stock and is of a suitable hard material, such as hardened steel, so that it provides sharp cutting edges in contact with the plate 13. The knife 14 in its hub 31 is provided with a square opening 32 therethrough.

The handle 15 is connected to the knife 14 to rotate it, the connection being by means of a shaft 33. The shaft 33 is provided with a square cut end 34 which fits in the square opening 32 in the knife 14 forming a driving connection between the shaft 33 and knife. The shaft 33 is riveted over the knife to fix the shaft and knife together. The shaft 33 is cut with a square cross section 35 at its other end and is also threaded at 36 at this end.

The handle 15 comprises an arm portion 37 having a knob 38 rotatably mounted on its outer end by means of a pin 39. The handle is provided with a square opening 40 at its other end, and the squared portion 35 of the shaft 33 extends through the opening 40, so that the handle 15 is rotatably fixed with respect to the shaft 33. A tubular gland 41 is disposed around the shaft 33 and serves to space the handle with respect to the plate 13 and to hold the knife 14 in frictional contact with the plate 13. A wing nut 42 is screwed on the threaded shaft portion 36 and serves to hold the handle fixed on the shaft 33. The frictional contact between the knife 14 and the plate 13 may be increased by tightening the nut 42, as is apparent.

The parts of the grinder should be made of non-toxic materials to avoid any possible poisoning of the food that is being ground. The base 10, the shell 11 and the cup 12 may be made of aluminum or nylon; the handle 15, the gland 41 and the shaft 33 may be made of stainless steel; and the knob 38 may be plastic—I have found that these materials are satisfactory in this respect. The grinder may be disassembled for cleaning purposes by pulling the base 10 out of the shell 11, unscrewing the cup 12 from the shell 11 and then removing the wing nut from the shaft 33 so that the shaft 33 may be pulled through the plate 13 thereby separating the handle 15, the gland 41, the knife 14 and the plate 13. The rubber ring 22 may be removed from the groove 21 as previously described for cleaning out the groove 21. The grinder parts may be reassembled in reverse order.

In order to use the grinder, the base 10 is pulled out of the shell 11. The rest of the grinder is in assembled condition as shown in Fig. 2. The food to be ground is then placed within the shell 11, and the piston portion 16 of the base 10 is reinserted into the shell 11. Alternately, the base 10 is left in the shell 11, and the cup 12 and plate 13 and the parts carried by the latter, including the knife 14, the shaft 33, the gland 41 and the handle 15, are removed from the shell 11 by unscrewing the cup 12, so that the shell 11 may be filled from the top. After replacement of the removed parts, the grinder is then preferably placed on a flat surface, such as a table top, and the shell 11 is gripped with one hand, and a downward force is put on the shell 11 in order to move the piston portion 16 into the shell as far as the food in the grinder will permit. The food is thus compressed between the flat top face 17 and the perforated plate 13, and in cases in which the original food is quite fluid, the food will actually be extruded upwardly through the holes 28 without any action of the knife 14. For ordinary grinding, however, the knife is used, and the knife is rotated and driven by turning the handle 15. The shaft 33, the gland 41, and the knife 14 rotate together, the gland 41 rotating as a bearing at its bottom surface resting on the top of the plate 13. A downward force is preferably put on the knob 38 as the handle is rotated, thereby augmenting the pressure put on the food in the grinder.

The knife, when thus driven, cuts the food compressed in the shell 11 by the piston portion 16, and it shears the food between its edges and the adjacent edges of the holes 28 as the food is extruded through the holes 28. The food is thus ground due to driving the knife 14 and simultaneously putting pressure on the food by forcing the shell downwardly, and the ground food accumulates in the cup 12. The food may be served directly from the cup 12, and the cup thus has a double purpose—namely, collecting the food as it is ground and also functioning as a serving dish. Since the base 10 has a flat top 17, substantially all of the food in the grinder may be ground, as the top 17 may move into contact with the lower end of the shaft 33 in very close proximity with the knife 14. In this case, the lower edge of the shell 11 will rest on the flange portion 20 of the base 10. During the grinding operation the ring 22 serves to prevent leakage of food past the piston portion 16 due to the pressure put on the food in the grinder.

My improved grinder may be very advantageously used to provide ground baby food. The cup 12 not only collects the food as it passes through the grinder, but it also serves as a feeding cup. The grinder is used in the upright position, and the cup is thus located so that it serves very well as a feeding receptacle. The food is forced into contact with the knife 14 by the piston portion 16 due to downward pressure put on the shell 11, and thus no auger is required for moving the food through the grinder. Since the flat top 17 comes very close to the knife 14 at the end of the travel of the piston portion 16, virtually all of the food in the grinder may be processed by the grinder, and there is very little waste of food. The grinder is advantageously constructed so that it may be easily disassembled for cleaning purposes. Food may be put in the grinder by filling the shell 11 from the bottom after removal of the base 10 or from the top after removal of the cup 12 and plate 13. The latter method of filling is particularly advantageous for juicy foods which may escape through the perforated plate 13 if the shell 11 is inverted.

I wish it to be understood that my invention is not to be limited to the specific constructions shown and described, except only so far as the claims may be so limited, as it will be understood to those skilled in the art that changes may be made without departing from the principles of the invention.

I claim:

1. In a food grinder, the combination of a tubular shell portion adapted to contain food, a piston slidable within said shell portion, a sealing ring of rubber-like material between said piston and shell portion and carried by said piston, an outwardly flared part on one end of said tubular shell portion, a perforated plate removably positioned across said last named end of said shell portion, said piston having a flat bottomed base adapted to set on a flat supporting surface so that said shell portion may be gripped by hand and downward force may be manually put on the shell portion disposed in an upright position to cause the shell portion to move downwardly over the piston to force the food through the perforated plate at the top of the shell portion and said flared part extending a substantial distance above said plate to form a receptacle for receiving the food as it is ground and from which the ground food may be served, a knife rotatable across the inner face of said plate for cutting the food as it passes through the plate, a shaft passing through said plate and fixed to said knife for rotating it, a handle disposed a substantial distance above the upper edge of said outwardly flared part and fixed to said shaft for rotating said shaft and knife as the food is forced through said plate by downward manual force on said shell portion, and a gland portion disposed about said shaft and spacing said handle and plate.

2. In a food grinder, the combination as set forth in claim 1, said sealing ring being round in cross section, said outwardly flared part having a screw threaded attachment with said tubular shell portion so as to be removable therefrom and having a flange overlying said plate and removably holding the plate positioned across the upper end of said shell portion.

References Cited in the file of this patent

UNITED STATES PATENTS

| | | |
|---|---|---|
| 965,384 | Gebauer | July 26, 1910 |
| 1,611,244 | Schmidt | Dec. 21, 1926 |
| 1,871,558 | Redwitz | Aug. 16, 1932 |
| 2,439,028 | Taylor | Apr. 6, 1948 |
| 2,572,960 | Steans | Oct. 30, 1951 |
| 2,647,810 | McCuistion | Aug. 4, 1953 |

FOREIGN PATENTS

| | | |
|---|---|---|
| 130,079 | Germany | Apr. 22, 1902 |
| 28,851 | Great Britain | of 1910 |
| 927,289 | Germany | May 5, 1955 |